United States Patent [19]

Porter et al.

[11] 3,997,935

[45] Dec. 21, 1976

[54] WINDSHIELD WIPER BLADE TREATMENT

[75] Inventors: Raymond P. Porter, North Dartmouth; Kenneth L. Manchester, Westport; Peter T. K. Shih, South Dartmouth, all of Mass.

[73] Assignee: Acushnet Company, New Bedford, Mass.

[22] Filed: May 29, 1975

[21] Appl. No.: 581,829

[52] U.S. Cl. .............................. 15/250.36; 15/118; 264/233; 264/340; 300/21; 526/45

[51] Int. Cl.² ........................................... B60S 1/04

[58] Field of Search ..................... 264/340, 233; 15/250.36, 118; 300/21; 260/94.7 HA; 526/45

[56] References Cited

UNITED STATES PATENTS

| | | | |
|---|---|---|---|
| 1,928,988 | 10/1933 | Watkins | 264/340 |
| 3,001,221 | 9/1961 | Wojciechowski | 15/250.36 |
| 3,035,297 | 5/1962 | Overman et al. | 300/21 |
| 3,345,348 | 10/1967 | Tennenhouse | 260/94.7 HA |
| 3,522,620 | 8/1970 | Nozawa et al. | 15/250.36 |
| 3,882,567 | 5/1975 | Herzog | 15/250.36 |

Primary Examiner—Jeffery R. Thurlow
Attorney, Agent, or Firm—Eyre, Mann, Lucas & Just

[57] ABSTRACT

Windshield wiper blades which have been previously treated with a halogen are subjected to treatment with a solution selected from the group of those having a pH above about 12 and those having a pH between 7 and 12 and a cation concentration of at least $-0.09$ pH $+ 1.13$ moles per liter where pH is the pH of the solution whereby improved wipe and wear properties are obtained.

14 Claims, No Drawings

WINDSHIELD WIPER BLADE TREATMENT

The present invention relates to windshield wiper blades and more particularly to treatment of the surface of the blades whereby wipe and wear characteristics are improved.

It is well known by anyone who has driven a truck or an automobile especially under so-called "misty" conditions that the wipe of a windshield wiper blade is far from acceptable. It is further known that when a windshield wiper blade is used under these conditions for any period of time, it quickly wears at least with respect to any effective wipe which it gives. This will commonly result in streaking of the windshield, a squeaking noise, or both.

There have been a myriad of attempts to improve windshield wiper blades by varying the blade holder design, the blade configuration, chemical treatment of the blade, and many other ways have also been tried to improve windshield wiper blades. However, none of these has been totally effective especially where the blade is frequently subjected to "misty" conditions.

In accordance with the present invention it has been found that treatment of a halogenated windshield wiper blade with a strongly alkaline solution or with a mildly alkaline solution having a high cation concentration will substantially improve the wipe and wear properties of the blade, especially under "misty" conditions. The treatment is preferably carried out in a solution having a pH above about 12 or between a pH of 7 and 12 with the cation concentration being at least $-0.09$ pH $+ 1.13$ moles per liter where pH is the pH of the solution.

Windshield wiper blades are made from a wide variety of elastomers, the most frequent of which are natural or synthetic rubber. Other elastomers from which windshield wiper blades are made include ethylenepropylene, diene/natural rubber mixtures, polybutadiene and the like. After the basic blade is formed, it is generally treated with a halogen, usually chlorine. The treatment may be with chlorine water or chlorine gas or other known methods of treatment. This halogenation procedure is well known in the art.

In the present invention the basic elastomer, which may be any elastomeric material treatable with a halogen, is treated with a halogen and is thereafter subjected to additional treatment. While any halogen can be employed, it is preferable that the halogenation be carried out with chlorine or bromine, the chlorine being most preferred.

After halogenation the blade of the present invention is subjected to additional treatment with a solution having a pH of above about 12 or a solution having a pH between 7 and 12 and a cation concentration of at least $-0.09$ pH $+ 1.13$ moles per liter where pH is the pH of the solution and preferably a cation concentration of at least $-0.18$ pH $+ 2.26$ moles per liter where pH is the pH of the solution. The additional treatment solution will generally be an aqueous solution and can suitably be an aqueous solution of ammonium hydroxide, cesium hydroxide, potassium hydroxide, sodium carbonate, sodium hydroxide, sodium bicarbonate, triethyl amine or the like. Best results have been obtained when the treating solution is at least one-half molar (0.5M) in concentration of sodium hydroxide, potassium hydroxide or cesium hydroxide. Best results are obtained with sodium hydroxide at a concentration of at least 1M.

The temperature and time for treatment are not absolutely critical. The temperature may suitably range from a low of about 20° C. (ambient temperatures) up to a temperature as high as the boiling point of the particular treatment solution employed. It is preferable that the temperature of the aqueous treatment solution be between about 40° C. and about 100° C. It has been found that temperatures below about 40° C. and above about 100° C. do not generally give as good results. It is pointed out that pre-soaking of the blade in water for periods of 15 minutes and preferably 30 minutes or more is of decided advantage at all temperatures. The time of treatment in the aqueous treatment solution is suitably from about 15 minutes to about seven hours or more.

The following are specific examples of treatments made in accordance with the present invention and show the wipe and wear characteristics of blades treated in accordance with the present invention as compared to blades which are identical except that they have not been treated with an additional solution in accordance with the present invention.

A number of examples were carried out to demonstrate the various aspects of the present invention. In each case a windshield wiper blade was used which was composed of polyisoprene, zinc oxide, carbon black, sulfur as a vulcanizing agent and the usual antioxidants, accelerators, etc. These blades are typical of those commercially available.

Each blade was halogenated in known manner (see for example U.S. Pat. No. 3,035,297) and then tested according to the wipe test described below. Thereafter, the blade was subjected to treatment in accordance with the present invention and was then subjected to an identical wipe test.

The wipe tests were performed using a conventional Ford "Galaxie 500" windshield and windshield wiper system. Wiper arm forces appropriate to this wiper system were employed. The tests were carried out by allowing the wiper blade to traverse the windshield wetted by means of a nozzle located above the windshield. After a number of passages of the blade, the wiper was stopped near one end of its stroke. The water was then shut off, after which the wiper was caused to pass over the windshield one time and stopped at the end of the stroke. The number of streaks left by the wiper blade were then immediately counted. The procedure was repeated but with the wiper blade initially at the opposite end of the stroke so that the number of streaks left during the upstroke and downstroke portions of the wipe cycle could be separately determined. The streaks from each stroke were then counted and added together to give the total number of streaks left in a complete wipe cycle. It will be understood that due to the very nature of windshield wiper blades, even blades having identical compositions will usually have different wipe characteristics. For this reason, the same blade was used in each example for both the control and the experimental tests.

EXAMPLE 1

A chlorinated wiper blade was subjected to the wipe test and was found to leave 21 streaks and a ¾ inch wide patch. The blade was then soaked in water for 1.5 hours and was then treated for 1 hour at 55° C. with a 1M sodium fluoride solution having a pH of 7. The blade was then rinsed with water and dried. In the wipe test the blade treated in accordance with the present invention left only 17 streaks and had a patch only 5/16 inch wide.

EXAMPLE 2

A brominated wiper blade was tested in the wipe test and was found to leave a 2-3/16 inch wide patch and 21 streaks. Thereafter, the blade was soaked in water for 1.5 hours and was then treated for six hours at 55° C. with a 1M sodium fluoride solution having a pH of 7. The blade was then rinsed and dried and tested according to the wipe test and gave only 14 streaks and a patch only 1-11/16 inch wide.

EXAMPLE 3

A chlorinated wiper blade was tested according to the wipe test and left 30 streaks and a patch 1-3/16 inch wide. The blade was then soaked in water for 2.75 hours after which it was treated for two hours at 55° C. with a 2M magnesium sulfate solution with sufficient sodium bicarbonate added to bring the pH of the solution up to 7.5. The rinsed and dried blade was then tested according to the wipe test and left only 27 streaks and a patch 13/16 inch wide.

EXAMPLE 4

A chlorinated wiper blade was tested according to the wipe test and was found to leave a patch ½ inch wide and 15 streaks. The blade was then soaked for 1.5 hours in water whereafter it was treated with a 2M sodium bicarbonate solution having a pH of about 8.5 for 2 hours at 55° C. The rinsed and dried blade was then tested in the wipe test and, while still having a ½ inch wide patch, had only 11 streaks.

EXAMPLE 5

A chlorinated wiper blade was tested in the wipe test and was found to leave 25 streaks and a ¼ inch wide patch. The blade was then soaked in water for 1.5 hours whereafter it was treated with a 2M diethylamine solution having a pH of 11 for 2 hours at 55° C. The blade was then rinsed and dried and tested in the wipe test. The blade with treatment in accordance with the present invention left only 18 streaks and did not leave any patch.

EXAMPLE 6

A chlorinated wiper blade was tested in the wipe test and found to leave a ⅝ inch wide patch and 11 streaks. The blade was then soaked in water for 1.5 hours and thereafter it was treated for two hours at 55° C. with a 0.08M triethylamine solution having a pH of 11.75. The rinsed and dried treated blade was then tested in the wipe test, yielded only 8 streaks and a patch 11/16 inch wide.

EXAMPLE 7

A chlorinated wiper blade was tested in the wipe test and was found to leave a patch ½ inch wide and 18 streaks. The blade was then soaked in water for 1.5 hours after which it was treated for 2 hours at 55° C. with a 3M triethanolamine solution having a pH of 11.75. The rinsed and dried blade when tested in the wipe test left a patch of only ⅝ inch width and left only 12 streaks.

EXAMPLE 8

A chlorinated wiper blade was tested according to the wipe test and was found to leave 15 streaks. The blade was then soaked in water for 1.5 hours whereafter it was treated for 2.25 hours at 55° C. with an 0.3M sodium carbonate solution having a pH of 12. The blade treated in accordance with the present invention left only 12 streaks on the windshield in the wipe test.

EXAMPLE 9

A chlorinated wiper blade was tested in the wipe test and was found to leave a patch 1⅝ inch wide and 28 streaks. The blade was treated for 30 minutes at 41° C. with a 1M sodium carbonate solution having a pH of 12.75. The blade treated in accordance with the present invention left only a 1⅛ inch wide patch and only 22 streaks on the windshield in the wipe test.

EXAMPLE 10

A brominated wiper blade was tested in accordance with the wipe test and left a 2⅞ inch wide patch and 57 streaks. The blade was then soaked for 30 minutes in water after which it was treated for 30 minutes at 60° C. with a 1M sodium carbonate solution having a pH of 12.75. The treated blade left a patch 3⅛ inch wide but had only 36 streaks in the wipe test.

EXAMPLE 11

A chlorinated wiper blade was tested according to the wipe test and was found to leave a 1-3/16 inch wide patch and 26 streaks. After treatment for one hour at 53° C. with a 10M sodium hydroxide solution, rinsing and drying, the blade, when tested according to the wipe test, was found to leave only a 13/16 inch wide patch and only 19 streaks.

EXAMPLE 12

A chlorinated wiper blade was tested in the wipe test and found to leave 32 streaks. The blade was soaked in water for one hour whereafter it was treated for 30 minutes at 55° C. with a 15M sodium hydroxide solution. The blade treated in accordance with the present invention was found to leave only 14 streaks in the wipe test.

EXAMPLE 13

A chlorinated blade was tested in the wipe test and was found to leave 20 streaks plus many weak streaks. The blade was then soaked in water for 1½ hours after which it was treated for 30 minutes at 65° C. with a 15M sodium hydroxide solution. The treated blade left only 6 streaks and one weak streak on the windshield in the wipe test.

EXAMPLE 14

A chlorinated wiper blade was tested in the wipe test and it was found that after 95,000 wipe cycles a ⅛ inch wide patch of water was left by the blade. An identical blade was treated for 1 hour at room temperature (approximately 20° C.) with a 1M sodium hydroxide solution and was found to go 235,000 wipe cycles in the wipe test before leaving a ⅛ inch wide patch of water on the windshield.

As can be seen, the blades treated in accordance with the present invention have substantially better wipe and wear characteristics as compared to blades which have not been treated in accordance with the present invention.

While the foregoing invention has been described with respect to windshield wiper blades, those skilled in the art will readily appreciate that the treatment of the present invention is equally applicable to any elastomeric implement to be used for the wiping of glass or similar surfaces. It will therefore be understood that the claims are intended to cover all changes and modifications of the preferred embodiments of the invention, herein chosen for the purpose of illustration, which do not constitute departure from the spirit and scope of the invention.

What is claimed is:

1. A method of treating elastomeric implements for wiping of smooth surfaces such as glass comprising:
   a. treating the elastomeric implement with a halogen, and thereafter;
   b. treating the halogenated elastomeric implement for at least about 15 minutes with a solution selected from the group consisting of solutions having a pH above about 12 and solutions having a pH from 7 to 12 and having a cation concentration of at least $-0.09$ pH $+ 1.13$ moles per liter where pH is the pH of the solution.

2. The method of claim 1 wherein the solution has a pH from 7 to 12 and a cation concentration of at least $-0.18$ pH $+ 2.26$ moles per liter where pH is the pH of the solution.

3. The method of claim 1 wherein the treatment takes place at a temperature of from about 40° C. to about 100° C.

4. The method of claim 1 wherein the treatment is carried out for a period of from about 15 minutes to about seven hours.

5. The method of claim 1 wherein the halogen treatment is with a bromine or chlorine.

6. The method of claim 5 wherein the treatment is with chlorine.

7. The method of claim 1 wherein the treating solution is an aqueous solution.

8. The method of claim 1 wherein the treating solution comprises at least one member selected from the group consisting of ammonium hydroxide, cesium hydroxide, potassium hydroxide, sodium carbonate, sodium hydroxide, sodium bicarbonate, and triethyl amine.

9. The method of claim 1 wherein the elastomeric implement is a windshield wiper blade.

10. A method of treating a windshield wiper blade comprising:
    a. treating the windshield wiper blade with a halogen selected from the group consisting of bromine and chlorine, and thereafter;
    b. treating the halogenated windshield wiper blade for a period of from about 15 minutes to about seven hours with a solution selected from the group consisting of solutions having a pH above about 12 and solutions having a pH from 7 to 12 and having a cation concentration of at least $-0.18$ pH $+ 2.26$ moles per liter where pH is the pH of the solution, said solution being at a temperature of from about 40° C. to about 100° C. and comprising at least one member selected from the group consisting of ammonium hydroxide, cesium hydroxide, postassium hydroxide, sodium carbonate, sodium hydroxide, sodium bicarbonate, and triethyl amine.

11. A windshield wiper blade treated in accordance with claim 10.

12. The method of claim 1 wherein the implement is presoaked in water before the treatment of step (b).

13. The method of claim 10 wherein the blade is presoaked in water before the treatment of step (b).

14. A method of treating a windshield wiper blade comprising the sequential steps of:
    a. treating the windshield wiper blade with a halogen selected from the group consisting of bromine and chlorine;
    b. soaking the halogenated windshield wiper blade in water for a period of at least 15 minutes;
    c. treating the soaked halogenated windshield wiper blade for a period of from about 15 minutes to about seven hours with an aqueous treatment solution having a temperature of from about 40° C. to about 100° C. and having an alkaline reagent concentration of at least about 0.5M, said alkaline reagent being selected from the group consisting of sodium hydroxide, potassium hydroxide, and cesium hydroxide.

* * * * *